F. SANDHAM.

Assignor to C. W. WOODFORD.

Machine for Stamping, Pressing and Pointing Horse-shoe-Nails.

No. 7,991. Reissued Dec. 11, 1877.

*Witnesses.*

Jno. A. Rennie

Edw. L. Stilwell

*Inventor.*

Frederick Sandham

Per Charles G. C. Simpson

Attorney

THE NORRIS PETERS CO., PHOTO-LITHO., WASHINGTON, D. C.

UNITED STATES PATENT OFFICE.

FREDERICK SANDHAM, OF OTTAWA, ONTARIO, CANADA, ASSIGNOR TO CHARLES W. WOODFORD.

IMPROVEMENT IN MACHINES FOR STAMPING, PRESSING, AND POINTING HORSESHOE-NAILS.

Specification forming part of Letters Patent No. 109,844, dated December 6, 1870; reissue No. 7,991, dated December 11, 1877; application filed November 3, 1877.

*To all whom it may concern:*

Be it known that I, FREDERICK SANDHAM, of the city of Ottawa, Province of Ontario, Canada, formerly of the city of Montreal, Province of Quebec, have invented a new and useful Device for Stamping, Pressing, and Pointing Horseshoe-Nails; and I do hereby declare that the following is a full, clear, and exact description of the nature thereof, sufficient to enable others skilled in the art to make and use the same, reference being had to the accompanying drawings, making part of this specification, in which—

Figure 1:
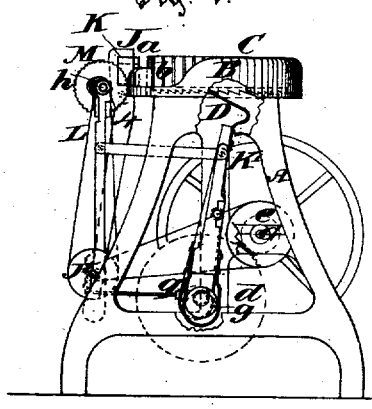
Figure 2:
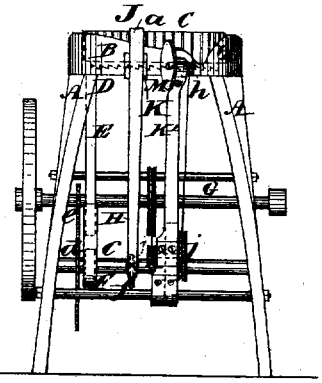
Figure 3:
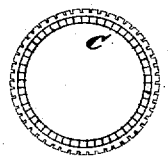
Figure 4:
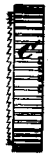
Figure 5:
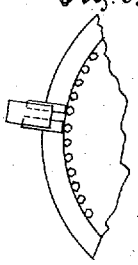

Figure 1 is a side view of the device illustrating my invention. Fig. 2 is a front view thereof; and Figs. 3 and 4 and 5 are detailed views.

Similar letters of reference indicate corresponding parts in the several figures.

My invention has for its object the trade-mark-stamping, pressing, and pointing of horse-nails; and consists of a head or dial provided with grooves or pockets for the nails, which are brought intermittingly to the action of the die having the design of the trade-mark formed in its face, then to a die which presses the nail, and subsequently to a cutter, which points them.

In the drawing, A represents a frame-work of suitable form and construction, and carrying at or about its upper end a bed, B, within which revolves a dial or head, C, on the periphery of which are formed vertical pockets or grooves designed to receive the partly-formed nails. The bed B nearly, but not wholly, encircles the periphery of the dial or head C, so that by it the nails placed in the grooves in its periphery are prevented from falling out except at the points *a* and *b*, where, at the former, the opening made is suitable for the die K to enter and act upon the nail, as will be hereinafter more particularly described, and at the latter a sufficient opening, *b*, is left for the nails to fall out of the grooves after having been acted upon by both of the tools J and M, and leave the grooves empty, to be charged by hand with fresh, partly-formed nails, to be acted upon.

There is also an opening, *a*, in the bed B, in front of the tool M, to enable it to pass in and act upon the point of the nails, but this is only a partial one, existing in the lower part of the portion of the bed B forming a ring about the periphery of the dial or head C, and does not amount to a total removal of it, as in the case with the other two openings.

The lower face of the dial is formed with ratchet-teeth, which are engaged by a spring-tooth or pawl, D, secured to an arm, E, and projecting through an opening in the bed B.

This arm E is suitably hung, and receives an oscillating motion by means of a cam or other device, F, which is secured to a shaft, *c*, having bearings in the frame A, and carrying a toothed wheel, *d*, which meshes with a pinion, *e*, on the main shaft G.

The operation of the spring-pawl is to slide over the ratchet-teeth on its backward movement and engage with them on the forward movement, and thus imparts an intermittent motion to the dial C.

On the shaft *c* there is keyed, or otherwise secured, an eccentric, *f*, which, by means of a yoke and connecting-rod imparts an oscillating motion to a lever, H. This lever is hinged to arms secured to the under side of the bed B, or to the frame-work A, and carries at its upper end dies J K, which advance toward, and recede from, the dial C, through the opening in the bed B at the point *a*.

On the die J is formed the trade-mark, manufacturer's name, or other distinguishing characteristic which is to be marked on the head of the nail.

The die K is the pressing-die, and is designed to force the body rough nails thoroughly into the pockets which hold them, and thereby impart the proper shape to them, besides compressing the metal, and thus strengthening the product.

An eccentric, *g*, is secured to the shaft *c*, and imparts an oscillating motion to an arm, K′, which is hung on a rod secured to the frame-work A, and is connected by a bar, or otherwise, to the upper end of a swinging arm, L, which receives a vibratory motion from said arm K′. M represents a rotating cutter whose axis is in the upper end of the arm L.

Rotary motion is imparted to the cutter by means of a pulley, *h*, on its axis, over which pulley passes a band or belt, which receives its motion from pulleys *j j*, mounted in the lower end of the lever L, which pulleys are operated by a band from a pulley on the main shaft. While the cutter rotates it is advanced to and receded from the dial C through the opening *a* in the bed B. The cutter is intended to bevel the face of the nail, about its point, so as to sharpen said point.

The amount or length of bevel may be regulated by raising or lowering the cutter-wheel. To this end the bearings of its axis, or the axis itself, is made adjustable.

The operation is as follows: The unfinished nails are laid or fed in the pockets or grooves in the dial, which is intermittingly rotated as stated. When a nail reaches a point directly in line with the die J, the latter advances toward the nail, stamps its head with the trade-mark design, and then recedes. The dial continues its motion and brings the stamped nail to the pressing-die K, which advances and presses the body of the nail into its pocket, thus compressing the metal and properly shaping the nail. During this operation an unfinished nail has been presented to the stamping-die J, and undergone the first process. It will be seen that during the subsequent operations, while one nail is being stamped the preceding one is being pressed. The nail being pressed is then carried around to the cutting-wheel M, and when it reaches it has the lower end of its face, at the point thereof, ground or beveled, so that the point is nicely sharpened and the nail is complete.

When the finished nail reaches the opening *b* it has no longer any support, and, consequently, drops on the floor or into a receptacle for the purpose intended.

In practice I design to employ spring-holders or fastenings, in order to firmly retain the nail on the dial until the three operations to which it is subjected are completed.

Having thus described my invention, what I claim as new, and desire to secure by Letters Patent, is—

1. The trade-mark stamping-die J, and the body-compressing die K, in combination with the rotating dial C and surrounding bed B, substantially as described.

2. The combination of the configurating-die J, body-compressing die K, rotating dial C, surrounding bed B, and the cutter M, substantially as described.

3. The combination of the dial or head C, situated to revolve in a horizontal position, and provided with vertical, pockets or grooves for suspending nails vertically as described, with the bed B, arranged for forming a ring about the periphery of the head C, with the exception of the openings formed therein for the passage of tools to act upon the nails and for the escape of the nails from the machine, substantially as and for the purpose set forth.

4. The combination of dial or head C, constructed as described, bed B, and die K, substantially as and for the purposes set forth.

Ottawa, 30th day of October, A. D. 1877.

FRED'K SANDHAM.

Witnesses:

HENRY GRIST,

T. H. PALING.